United States Patent
Cho et al.

(10) Patent No.: US 11,867,851 B2
(45) Date of Patent: Jan. 9, 2024

(54) LARGE-AREA RADIOACTIVE SURFACE CONTAMINATION MEASUREMENT DEVICE USING PLURALITY OF DETECTORS

(71) Applicant: Korea Hydro & Nuclear Power Co., Ltd., Gyeongju-si (KR)

(72) Inventors: Moon Hyung Cho, Yuseong-gu (KR); Yu Ho Weon, Yuseong-gu (KR); Hyeongjin Kim, Yuseong-gu (KR)

(73) Assignee: Korea Hydro & Nuclear Power Co., Ltd., Gyeongju-si (KR)

( * ) Notice: Subject to any disclaimer, the term of this patent is extended or adjusted under 35 U.S.C. 154(b) by 0 days.

(21) Appl. No.: 17/789,421

(22) PCT Filed: Dec. 11, 2020

(86) PCT No.: PCT/KR2020/018119
§ 371 (c)(1),
(2) Date: Jun. 27, 2022

(87) PCT Pub. No.: WO2021/141256
PCT Pub. Date: Jul. 15, 2021

(65) Prior Publication Data
US 2023/0035596 A1  Feb. 2, 2023

(30) Foreign Application Priority Data
Jan. 6, 2020  (KR) .................. 10-2020-0001145

(51) Int. Cl.
*G01T 1/169*  (2006.01)
*G01T 1/167*  (2006.01)
*G01T 7/08*  (2006.01)

(52) U.S. Cl.
CPC ............. *G01T 1/169* (2013.01); *G01T 1/167* (2013.01); *G01T 7/08* (2013.01)

(58) Field of Classification Search
CPC ........... G01T 1/169; G01T 1/167; G01T 7/08
See application file for complete search history.

(56) References Cited

FOREIGN PATENT DOCUMENTS

| CN | 108562925 A | * 9/2018 | ............. G01T 1/167 |
|---|---|---|---|
| JP | 2001249179 A | 9/2001 | |
| JP | 2015219066 A | 7/2015 | |
| KR | 20110117325 A | 10/2011 | |
| KR | 20140075164 A | 6/2014 | |
| KR | 101419766 B1 | 7/2014 | |
| KR | 2019141380 A | * 12/2019 | ............. G01N 33/24 |
| KR | 20190141380 A | 12/2019 | |
| KR | 102140038 B1 | 7/2020 | |

* cited by examiner

*Primary Examiner* — David P Porta
*Assistant Examiner* — Fani Polyzos Boosalis
(74) *Attorney, Agent, or Firm* — Standley Law Group LLP; James L. Kwak; Kenny W. Pung (57) ABSTRACT

A device for measuring large-area radioactive surface contamination can simultaneously obtain a plurality of detection values. The measurement device includes a frame body having a plurality of holes; a mover that is connected to, and moves, the frame body; and a plurality of radiation detectors that rest in the plurality of holes. The detectors detect one or more of: alpha rays, beta rays, or gamma rays. The location and level of radioactive contamination are accurately identified according to a comparison of the detection values of the plurality of radiation detectors.

14 Claims, 6 Drawing Sheets

LARGE-AREA RADIOACTIVE SURFACE CONTAMINATION MEASUREMENT DEVICE USING PLURALITY OF DETECTORS

TECHNICAL FIELD

The present disclosure relates to a large-area radioactive surface contamination measurement device capable of simultaneously obtaining a plurality of detection values so that an accurate hot spot where radiation is detected can be identified.

BACKGROUND ART

A radioactive surface contamination measurement device is a device that measures the amount of radioactivity of a nuclide by detecting alpha rays, beta rays, or gamma rays emitted from a radionuclide. As a detector of a radioactive surface contamination measurement device, a Geiger-Müller (GM) detector, a proportional counter, a scintillation detector, and so on are used according to a type of radiation emitted from a nuclide.

Generally, the GM detector and the proportional counter are used to measure alpha rays and beta rays, and the scintillation detector that is manufactured of NaI, bismuth germanate (BGO), or the like as a detection element having a high density is used to measure gamma rays.

Commercially available equipment for measuring alpha rays and beta rays has a detector size of 15 $cm^2$ to 600 $cm^2$, and hardly measures gamma rays. Therefore, considering that a nuclide emitting alpha rays, beta rays, and gamma rays is detected in a nuclear power plant, not only a detector for detecting alpha rays and beta rays but also a detector for detecting gamma rays is required to be used. However, among commercially available large-area radioactive contamination measurement equipment, there is no equipment that measures alpha rays and beta rays, as well as gamma rays.

Figure 1:
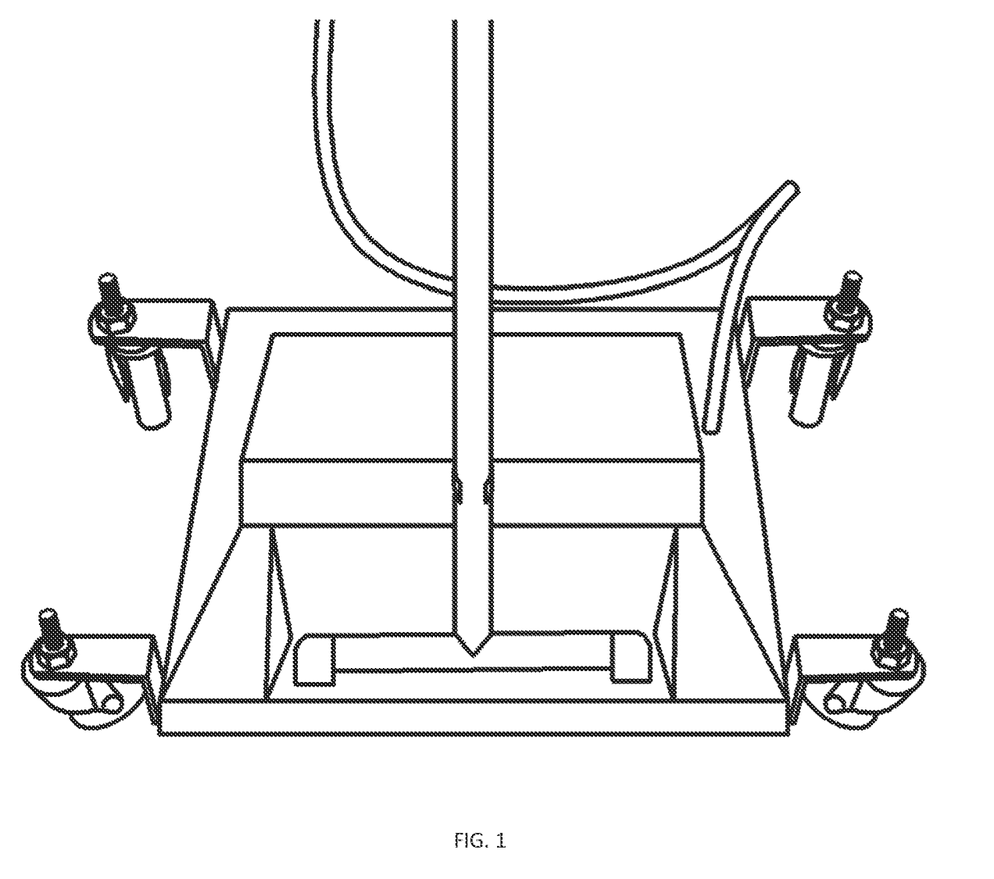
FIG. 1 shows a top perspective photograph of a conventional large-area radioactive surface contamination measurement device, as known in the prior art.
Figure 2:
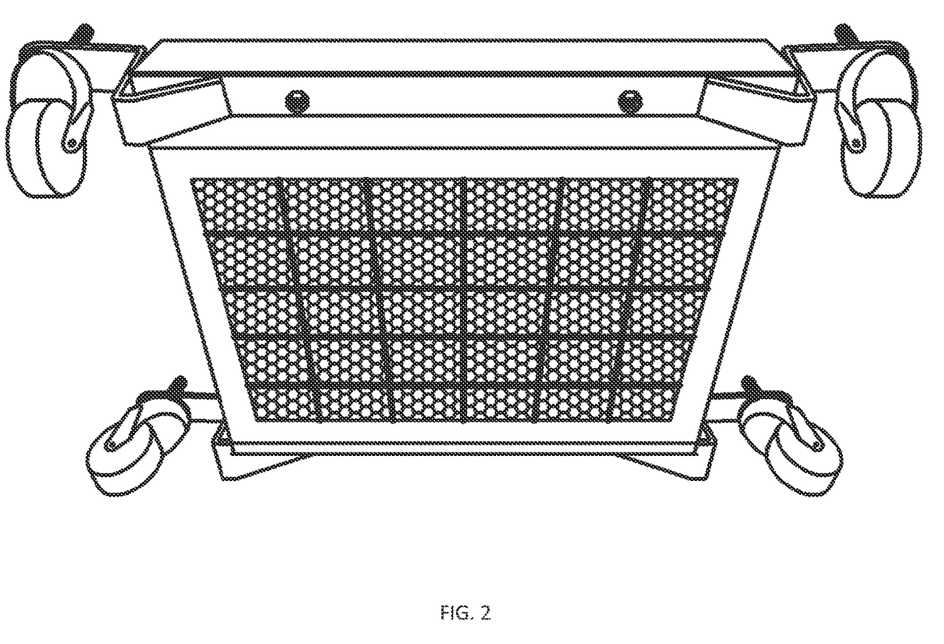
FIG. 2 is a bottom perspective photograph of the FIG. 1 prior art device.

The photographs of FIGS. 1 and 2 show a top perspective view and a bottom perspective view of FLM3D, a known device in the prior art from Thermo, and FLM3D has a detector size of 600 $cm^2$. Further, such a product is used for measuring a floor surface within a radiation controlled area, or is used for measuring alpha rays and beta rays on a wide range of sites, such as when a nuclear plant is dismantled.

Figure 3:
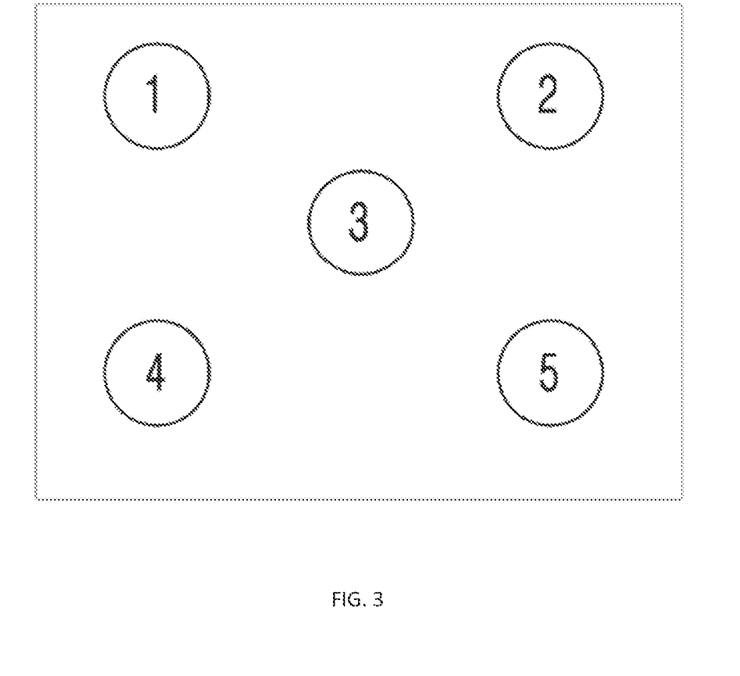
FIG. 3 is a conceptual view illustrating an operation of the prior art measurement device of FIGS. 1 and 2.

The larger the area of the detector, the shorter the measurement time, but a location contaminated by a radionuclide cannot be accurately determined. For example, in a detection area of a detector that has a size of 600 $cm^2$ (width of 30 cm×length of 20 cm), as illustrated in FIG. 3, the same detection signal is generated, regardless of the location of the radionuclide (1 to 5 in FIG. 3). Therefore, in order to find a detailed contamination location, it is necessary to re-measure the detection area with a detector having a small detection area.

The smaller the detector area, the more accurate the measurement of the contamination area, but the longer the measurement time is required.

However, since identification and control of radiation controlled area are required to be performed rapidly, development of a large-area radioactive surface contamination measurement device capable of measuring a large area quickly and also capable of measuring an accurate hot spot (concentrated radiation contamination area) is urgently required.

DOCUMENT OF RELATED ART

Korean Patent No. 10-1419766 (published on Jul. 21, 2014)

DISCLOSURE

Technical Problem

Accordingly, the present disclosure has been made keeping in mind the above problems occurring in the related art, and an objective of the present disclosure is to provide a large-area radioactive surface contamination measurement device capable of simultaneously increasing speed, efficiency, and accuracy of measurement by enabling accurate observation of a radioactive contamination location even when a large-area is scanned in a short time.

Technical Solution

In order to achieve the above objective, according to the present disclosure, there is provided a large-area radioactive surface contamination measurement device, the device including: a frame body 10 with a plurality of holes formed; a mover 20 connected to the frame body 10 to move the frame body 10; a plurality of radiation detection modules 30a and 30b each seated in the plurality of holes to detect any one or two or more of alpha rays, beta rays, and gamma rays; and a control unit for calculating a radioactive contamination location and a radioactive contamination level by comparing detection values of the plurality of radiation detection modules 30a and 30b with each other.

Preferably, the plurality of holes may be formed side by side at equal intervals.

Preferably, both the frame body 10 and the mover 20 may be mounted with casters in their lower portion, and a direction in which the plurality of holes are formed side by side may be perpendicular to a direction in which the frame body 10 and the mover 20 are connected to each other.

Preferably, each of the plurality of radiation detection modules may include: counters 31a and 31b seated in each of the plurality of holes; photomultiplier tubes 32a and 32b coupled to the counters 31a and 31b; and channel units 34, 35, and 36 mounted on the photomultiplier tubes 32a and 32b, wherein seating wings 33a and 33b are formed to extend horizontally from sides of the counters 31a and 31b so as to be seated on a perimeter of each of the plurality of holes.

Preferably, one or two channel units 34, 35, and 36 may be mounted on one photomultiplier tube 32a and 32b, and each of the two channel units 34, 35, and 36 may be configured to detect radioactivity different from each other.

Preferably, the control unit receiving detection information in real time from the plurality of radiation detection modules 30a and 30b to determine whether an area is radioactively contaminated may be further included, and the control unit may be provided with a computing mechanism to perform an algorithm assigning an identifier to each of the plurality of radiation detection modules 30a and 30b, computing a detection value periodically received from each identifier and a speed value of the plurality of radiation detection modules 30a and 30b moved by the mover 20, and deriving a radioactive detection map in real time on an area formed of a movement trajectory of the frame body 10.

Advantageous Effects

According to the large-area radioactive surface contamination measurement device of the present disclosure, since the accurate observation of the radioactive contamination location can be realized even when the large-area is scanned in a short time, there is an effect that rapidness in speed, efficiency, and accuracy of the measurement is increased simultaneously.

BEST MODE

Specific structures and functions stated in the following embodiments of the present disclosure are exemplified to illustrate embodiments according to the spirit of the present disclosure and the embodiments according to the spirit of the present disclosure can be achieved in various ways. Further, the present disclosure should not be construed as being limited to the following embodiments and should be construed as including all changes, equivalents, and replacements included in the spirit and scope of the present disclosure.

Hereinafter, an embodiment of the present disclosure will be described in detail with reference to the accompanying drawings.

As illustrated in FIGS. 4 to 7, a large-area radioactive surface contamination measurement device according to the present disclosure includes a frame body 10, a mover 20, a plurality of radiation detection modules 30a and 30b, and a control unit for calculating a location and a level of radioactive contamination by comparing detection values of the plurality of radiation detectors with each other.

In the frame body 10, a plurality of holes (not illustrated) is formed such that the plurality of radiation detection modules 30a and 30b can be mounted in the plurality of holes.

As described with reference to FIG. 2, in a conventionally used large-area radioactive surface contamination measurement device, an accurate location where a radionuclide is detected in a detector is difficult to be identified. Therefore, when radioactive surface contamination of a large area is measured with a small-area detector, a considerable time is required.

Thus, in an embodiment illustrated in FIGS. 4 to 7, a form in which the plurality of radiation detection modules 30a and 30b are provided and are simultaneously mounted in one frame body 10 so that the plurality of radiation detection modules 30a and 30b is capable of being moved integrally is configured. Therefore, a radioactive surface contamination measurement of an area equal to or larger than an area measured by the conventional large-area radioactive surface contamination measurement device can be measured, and the plurality of radiation detection modules 30a and 30b can respectively perform the measurement, so that a large-area radioactive surface contamination measurement device capable of searching a 'hot spot' that is a location most intensively radioactively contaminated is proposed.

At this time, the plurality of radiation detection modules 30a and 30b respectively mounted in the frame body 10 is configured to detect one or more alpha rays, beta rays, and gamma rays. In an embodiment in FIGS. 8 to 15, an alpha ray and beta ray detection module 30a and a gamma rays detection module 30b are illustrated.

Conventionally used radiation detectors are used as the radiation detection modules 30a and 30b, but is manufactured to be respectively inserted in the plurality of holes (not illustrated) that is formed in the frame body 10. In addition, there is no detector that can measure alpha rays, beta rays, and gamma rays all together. However, in the alpha rays and beta rays detection module 30a, a Phoswich detector that can measure both alpha rays and beta rays may be manufactured in a form of a module. Further, in the gamma rays detection module 30b, a NaI detector that can measure gamma rays may be manufactured in a form of a module.

Figure 7:
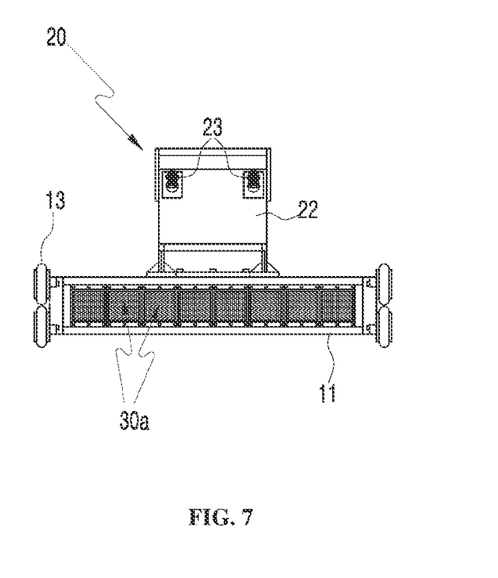
FIG. 7 illustrates a bottom plan view of the large-area radioactive surface contamination measurement device according to an embodiment of the present disclosure.
Figures 8, 9:
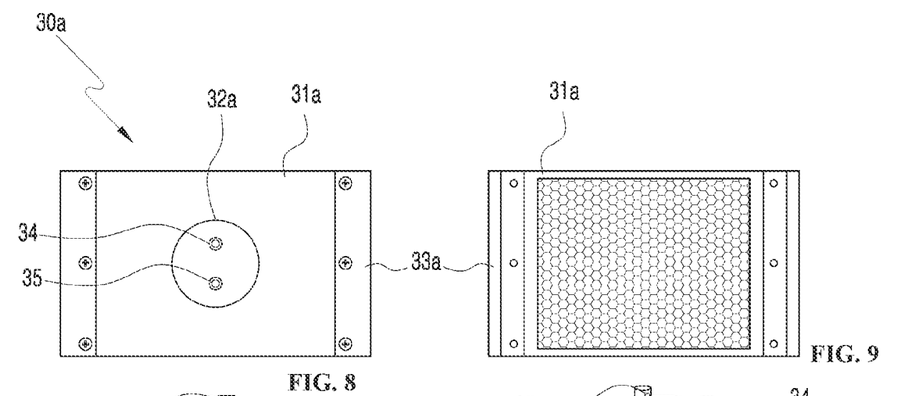
FIG. 8 illustrates a top plan view illustrating a radiation detection module for detecting alpha rays and beta rays.
FIG. 9 illustrates a bottom plan view illustrating a radiation detection module for detecting alpha rays and beta rays.
Figure 10:
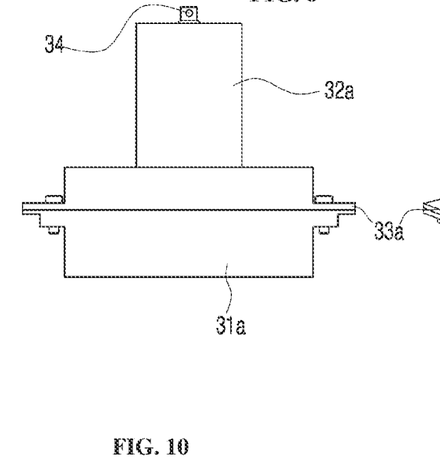
FIG. 10 illustrates a front elevation view illustrating a radiation detection module for detecting alpha rays and beta rays.
Figure 11:
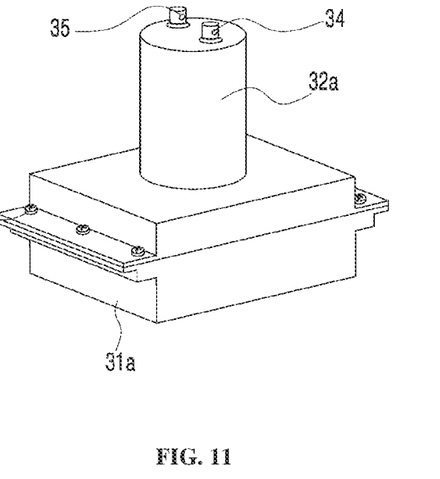
FIG. 11 illustrates a perspective view illustrating a radiation detection module for detecting alpha rays and beta rays.
Figure 12:
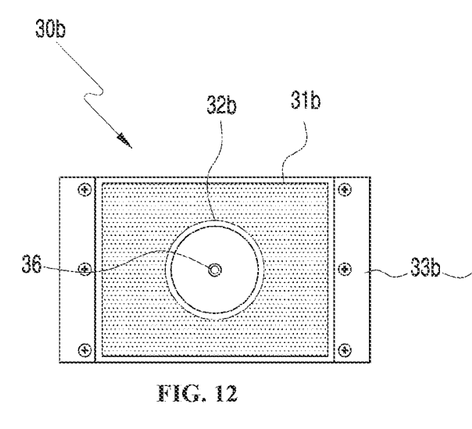
FIG. 12 illustrates a top plan view illustrating a radiation detection module for detecting gamma rays.
Figure 13:
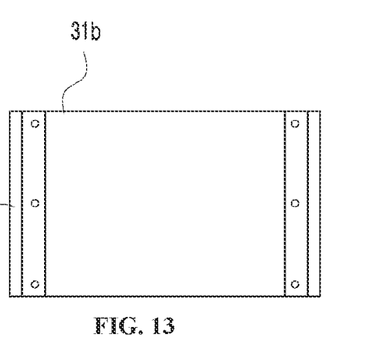
FIG. 13 illustrates a bottom plan view illustrating a radiation detection module for detecting gamma rays.
Figure 14:
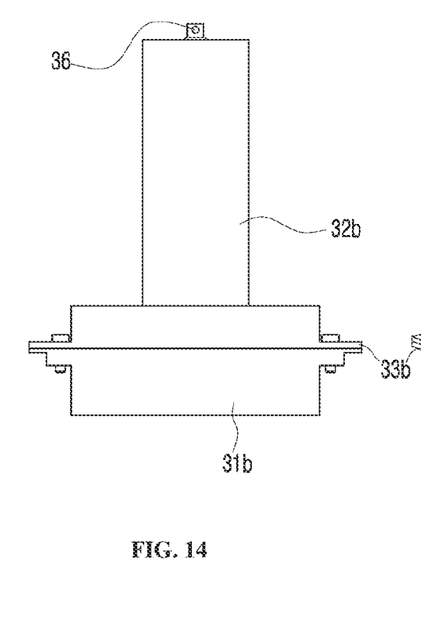
FIG. 14 illustrates a front elevation view illustrating a radiation detection module for detecting gamma rays.
Figure 15:
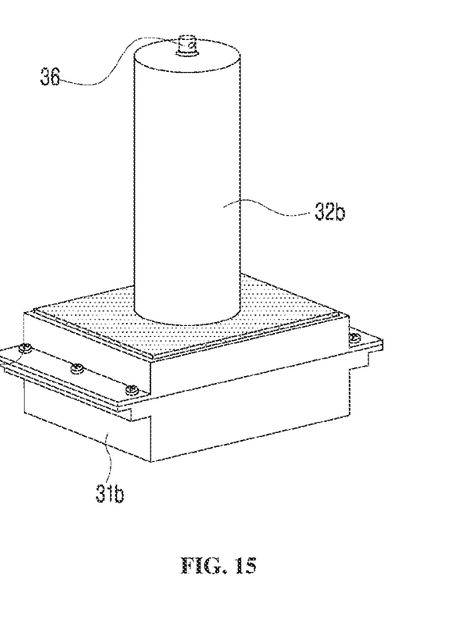
FIG. 15 illustrates a perspective view illustrating a radiation detection module for detecting gamma rays.

In FIG. 7, a left side view illustrates a state in which the plurality of radiation detection modules 30a and 30b is mounted. Further, although the plurality of holes formed in the frame body 10 such that the plurality of radiation detection modules 30a and 30b can be respectively mounted therein is not seen, the plurality of radiation detection modules 30a and 30b is respectively mounted in the plurality of holes.

Particularly, as can be seen in FIG. 7, the plurality of holes is formed side by side at equal intervals. Therefore, the plurality of radiation detection modules 30a and 30b detects a presence of a radioactive contaminant source on the basis of differential values according to a distance from the radioactive contaminant source, so that an accurate location and an accurate level of the radioactive contaminant source can be identified by a combination of differential detection values according to a relative location between the radioactive contaminant source and each of the plurality of the radiation detection modules 30a and 30b.

The mover 20 is connected to the frame body 10 such that frame body 10 can be moved. More specifically, referring to FIGS. 4 to 7, the mover 20 may be configured of a tow handle 21, a balance plate 22, and tow casters 23. At this time, the tow casters 23 are attached to a bottom surface of the balance plate 22 and a bottom surface of the frame body 10, thereby increasing mobility.

Since the mover 20 is mounted on the frame body 10, the plurality of holes formed in the frame body 10 or the plurality of radiation detection modules 30a and 30b mounted in the plurality of holes does not need to be formed as a plurality of columns, but can be formed as only one column.

That is, even if the radiation detection modules 30a and 30b that are mounted side by side in the frame body 10 form only one array, the frame body 10 can be moved forward and backward due to the mover 20. Therefore, in a process of moving the frame body 10, an entire area of the surface formed along a movement trajectory of the frame body 10 is detected, so that the radiation detection modules 30a and 30b do not need to be mounted as a plurality of arrays. Further, even if the radiation detection modules 30a and 30b are mounted as one array, the same effect as when the radiation detection modules 30a and 30b are mounted as the plurality of arrays can be realized.

As illustrated in FIGS. 8 to 15, the plurality of radiation detection modules 30a and 30b is respectively formed of a counters 31a and 31b seated in the plurality of holes, photomultiplier tubes 32a and 32b coupled to the counters 31a and 31b, and channel units 34, 35, and 36 mounted on the photomultiplier tubes 32a and 3b. In both FIGS. 8 to 11 and FIGS. 12 to 15, a top plan view, a bottom plan view, a front view, and a perspective view are illustrated in increasing numerical order.

Two channel units 34 and 35 mounted on the radiation detector in FIG. 3A are an alpha rays channel unit 34 and a beta rays channel unit 35, respectively. As such, a detector that can detect both alpha rays and beta rays is a phoswich detector as a representative example, and any other radiation detector that can detect both alpha rays and beta rays can be employed.

In the radiation detection module 30b illustrated in FIGS. 12 to 15, only a gamma rays channel unit 36 is provided. Therefore, as the radiation detection module 30b in FIG. 3B, a NaI detector or any other detector that can detect gamma rays can be employed.

Both the detectors in FIGS. 8 to 15 have seating wings 33a and 33b on side surfaces of the counters 31a and 31b, respectively, and are formed such that both the detectors can be placed on the plurality of holes (not illustrated) that is formed in the frame body 10. At this time, as illustrated in FIGS. 3A and 3B, the seating wings 33a and 33b are provided with steps facing downward. Further, the steps are placed on an upper portion of a perimeter of the plurality of holes, respectively, and a lower portion of the steps are inserted into the respective holes. Therefore, the seating wings 33a and 33b may be very easily inserted into and pulled out from the respective holes.

Figure 4:
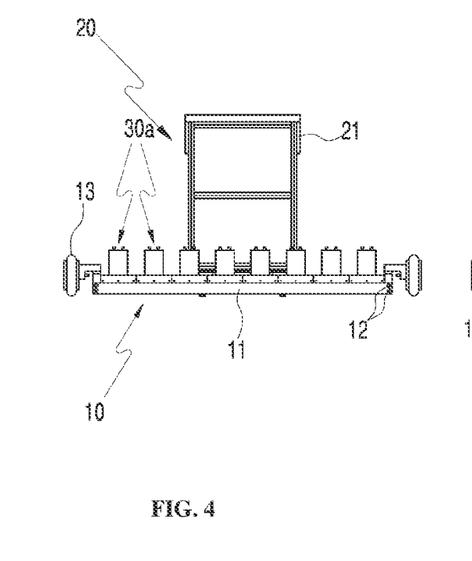
FIG. 4 illustrates a front elevation view of a large-area radioactive surface contamination measurement device according to an embodiment of the present disclosure.
Figure 5:
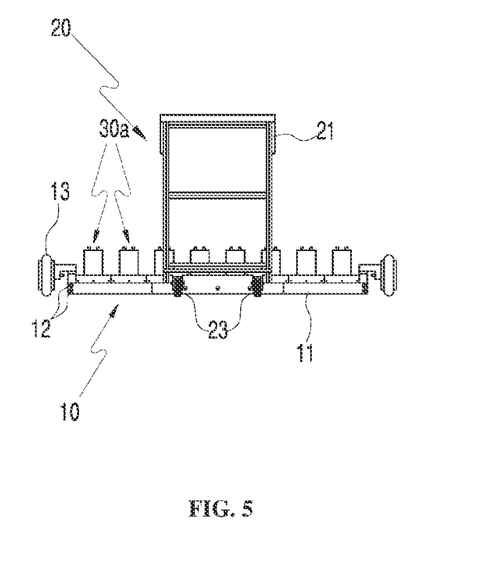
FIG. 5 illustrates a rear elevation view of a large-area radioactive surface contamination measurement device according to an embodiment of the present disclosure.
Figure 6:
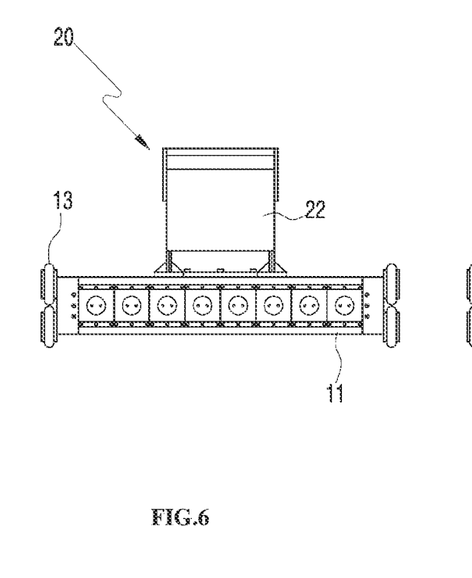
FIG. 6 illustrates a top plan view of the large-area radioactive surface contamination measurement device according to an embodiment of the present disclosure.

In addition, as illustrated in FIGS. 4 and 5, a height adjustment switch 12 that can adjust a height of the radiation detector is provided on the frame body 10. Therefore, when a surface height is uneven, an installation height of the radiation detection modules 30a and 30b can be adjusted instantly, so that a uniform investigation value may be obtained.

Meanwhile, although not illustrated in drawings, the control unit which receives detection information from the plurality of radiation detection modules 30a and 30b in real time and which identifies whether an area is radioactively contaminated may be further mounted.

The control unit has a computing mechanism to perform an algorithm which assigns identifiers to each of the plurality of radiation detection modules 30a and 30b, computes a detection value periodically received from each of the identifiers and a speed value of the plurality of radiation detection modules 30a and 30b moved by the mover 20, and derives a radioactive detection map in real time on an area formed of the movement trajectory of the frame body 10.

That is, throughout an area corresponding to a trajectory that the large-area radioactive surface contamination measurement device according to an embodiment in FIGS. 4 to 7 is moved by the mover 20, a time passed for each part and a tow speed for each part are variables, and the identifiers are respectively assigned to the radiation detection modules 30a and 30b. Therefore, in the entire area that is investigated, a radiation detection value may be obtained in units of a grid area equal to a size of one of the radiation detection modules 30a and 30b, so that a detection map in which the degree of detection of radioactivity may be determined over the entire investigated area is finally obtained. Therefore, an accurate location of contaminated surface can be identified, so that the hot spot can be accurately identified.

The specific embodiment of the present disclosure is described in detail above. However, the present disclosure is not limited to the specific embodiment. It would be apparent to a person of ordinary skill in the art that various modifications to the present disclosure are possible within the scope of the technical idea of the present disclosure.

DESCRIPTION OF REFERENCE NUMERALS

10: frame body 11: seating member
12: height adjustment switch 13: body caster
20: mover 21: tow handle
22: balance plate 23: tow caster
30a: alpha rays and beta rays detection module 30b: gamma rays detection module
31a and 31b: counters 32a and 32b: photomultiplier tubes
33a and 33b: seating wings 34: alpha rays channel unit
35: beta rays channel unit 36: gamma rays channel unit

The invention claimed is:

1. A large-area radioactive surface contamination measurement device, comprising:
a frame body with a plurality of holes formed;
a mover connected to the frame body to move the frame body;
a plurality of radiation detection modules, each seated in the plurality of holes to detect at least one of: alpha rays, beta rays, and gamma rays; and
a control unit for calculating a radioactive contamination location and a radioactive contamination level by comparing detection values of the plurality of radiation detection modules with each other;
wherein each radiation detection module comprises:
a counter seated in each of the plurality of holes, each counter having at least one horizontally extending seating wing for seating the counter;
a photomultiplier tube coupled to the counter; and
a channel unit mounted on the photomultiplier tube.

2. The device of claim 1, wherein the plurality of holes all have the same size and shape, and are formed side by side at equal intervals.

3. The device of claim 1, further comprising:
casters, mounted on both the frame body and the mover in a lower portion, and
a direction in which the plurality of holes are formed side by side is perpendicular to a direction in which the frame body and the mover are connected to each other.

4. The device of claim 3, further comprising:
a height adjustment switch on the frame body to adjust a height of the plurality of radiation detection modules.

5. The device of claim 3, wherein the control unit receives detection information in real time from the plurality of radiation detection modules to determine whether an area is radioactively contaminated, and is provided with a computing mechanism to perform an algorithm assigning an identifier to each of the plurality of radiation detection modules, computing a detection value periodically received from each identifier and a speed value of the plurality of radiation detection modules moved by the mover, and deriving a radioactive detection map in real time on an area formed of a movement trajectory of the frame body.

6. The device of claim 3, further comprising:
casters, mounted on both the frame body and the mover in a lower portion, and
a direction in which the plurality of holes are formed side by side is perpendicular to a direction in which the frame body and the mover are connected to each other.

7. The device of claim 6, further comprising:
a height adjustment switch on the frame body to adjust a height of the plurality of radiation detection modules.

8. The device of claim 6, wherein the control unit receives detection information in real time from the plurality of radiation detection modules to determine whether an area is radioactively contaminated, and is provided with a computing mechanism to perform an algorithm assigning an identifier to each of the plurality of radiation detection modules, computing a detection value periodically received from each identifier and a speed value of the plurality of radiation detection modules moved by the mover, and deriving a radioactive detection map in real time on an area formed of a movement trajectory of the frame body.

9. The device of claim 1, wherein some of the photomultiplier tubes have two channel units mounted thereon with the respective channel units, configured to detect radioactivity different from each other.

10. The device of claim 9, further comprising:
a height adjustment switch on the frame body to adjust a height of the plurality of radiation detection modules.

11. The device of claim 9, wherein the control unit receives detection information in real time from the plurality of radiation detection modules to determine whether an area is radioactively contaminated, and is provided with a computing mechanism to perform an algorithm assigning an identifier to each of the plurality of radiation detection modules, computing a detection value periodically received from each identifier and a speed value of the plurality of radiation detection modules moved by the mover, and deriving a radioactive detection map in real time on an area formed of a movement trajectory of the frame body.

12. The device of claim 9, further comprising:
casters, mounted on both the frame body and the mover in a lower portion, and
a direction in which the plurality of holes are formed side by side is perpendicular to a direction in which the frame body and the mover are connected to each other.

13. The device of claim 12, further comprising:
a height adjustment switch on the frame body to adjust a height of the plurality of radiation detection modules.

14. The device of claim 12, wherein the control unit receives detection information in real time from the plurality of radiation detection modules to determine whether an area is radioactively contaminated, and is provided with a computing mechanism to perform an algorithm assigning an identifier to each of the plurality of radiation detection modules, computing a detection value periodically received from each identifier and a speed value of the plurality of radiation detection modules moved by the mover, and deriving a radioactive detection map in real time on an area formed of a movement trajectory of the frame body.

* * * * *